United States Patent
Kajihara et al.

(10) Patent No.: US 11,230,238 B2
(45) Date of Patent: Jan. 25, 2022

(54) VEHICLE SEAT AND METHOD OF MANUFACTURING THE SAME

(71) Applicant: TOYOTA BOSHOKU KABUSHIKI KAISHA, Aichi-ken (JP)

(72) Inventors: Takehiro Kajihara, Aichi-ken (JP); Kenji Hayata, Aichi-ken (JP); Hiroka Kohama, Saga-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/124,526

(22) Filed: Sep. 7, 2018

(65) Prior Publication Data

US 2019/0084503 A1 Mar. 21, 2019

(30) Foreign Application Priority Data

Sep. 15, 2017 (JP) .............................. JP2017-177714

(51) Int. Cl.
*B60R 16/02* (2006.01)
*B60R 16/037* (2006.01)

(52) U.S. Cl.
CPC ........ *B60R 16/0215* (2013.01); *B60R 16/037* (2013.01)

(58) Field of Classification Search
CPC .......................... B60R 16/037; B60R 16/0215
USPC ....................................................... 297/217.3
See application file for complete search history.

(56) References Cited

U.S. PATENT DOCUMENTS

| | | | | |
|---|---|---|---|---|
| 4,728,068 A * | 3/1988 | Rivkin | ................. | F16B 21/088 24/297 |
| 5,401,905 A * | 3/1995 | Lesser | ..................... | H02G 3/26 138/108 |
| 8,226,145 B2 * | 7/2012 | Kasuya | ............... | B60R 16/0215 297/217.3 X |
| 9,731,636 B1 * | 8/2017 | Takeuchi | ............. | B60N 2/6009 |
| 2013/0256028 A1 * | 10/2013 | Oiwa | ................. | B60R 16/0215 174/72 A |
| 2014/0159447 A1 * | 6/2014 | Saitou | .................... | B60N 2/70 297/217.3 X |

(Continued)

FOREIGN PATENT DOCUMENTS

JP 6-133830 5/1994
JP 2017-094877 A 6/2017

OTHER PUBLICATIONS

Office Action in counterpart Japanese Application No. 2017-177714, dated Jan. 26, 2021.

*Primary Examiner* — Anthony D Barfield
(74) *Attorney, Agent, or Firm* — Greenblum & Bernstein, P.L.C.

(57) ABSTRACT

A vehicle seat includes: a seat frame; a wire harness routed along the seat frame; and a fixture configured to fix the wire harness to the seat frame. The fixture is formed of a resin molded product made of a single member including a portion to be held and a plurality of holding portions, the portion to be held being configured to be held by the seat frame, and each of the plurality of holding portions being configured to hold a corresponding one of a plurality of different portions in the wire harness that are located in an extending direction of the wire harness. The wire harness is routed in a state where the wire harness in a bent state is held by the plurality of holding portions.

6 Claims, 8 Drawing Sheets

(56) References Cited

U.S. PATENT DOCUMENTS

2016/0082904 A1* 3/2016 Marks ................ B60R 16/0215
428/99

* cited by examiner

VEHICLE SEAT AND METHOD OF MANUFACTURING THE SAME

This nonprovisional application is based on Japanese Patent Application No. 2017-177714 filed on Sep. 15, 2017 with the Japan Patent Office, the entire contents of which are hereby incorporated by reference.

BACKGROUND

Field

The present disclosure relates to a vehicle seat and a method of manufacturing the vehicle seat, and particularly to a vehicle seat installed in a vehicle such as an automobile, and a method of manufacturing the vehicle seat.

Description of the Background Art

In many cases, inside a vehicle seat installed in an automobile, various types of electrical components, wire harnesses and the like are installed in addition to a seat frame forming the framework of the vehicle seat. For example, in a vehicle seat including an electrically-powered reclining mechanism, an electrically-powered lumbar support mechanism and the like, an actuator as an electrical component, a control unit for controlling the operation of the actuator, a wire harness providing connection between these electrical components, and the like are installed inside a seat cushion or a seat back.

In many cases, a wire harness is routed so as to extend along a seat frame inside the vehicle seat. In such a case, the wire harness is generally configured such that its prescribed portions located along the extending direction of the wire harness are fixed to the seat frame.

There are various methods for fixing a wire harness to a seat frame, for example, including: a method of holding a wire harness by a hook portion that is formed by cutting and raising a part of the seat frame; a method of fitting a clip, which is attached to a wire harness, into a hole or the like provided in a seat frame; and the like. Among them, the former method configuration is specifically disclosed, for example, in Japanese Patent Laying-Open No. 06-133830.

SUMMARY

Generally, when manufacturing a vehicle seat, a wire harness is often fixed to a seat frame in the final stage in which other components to be installed in the seat frame have already been installed to some extent. Also, generally, a wire harness is often accommodated inside the vehicle seat so as to weave across the space inside thereof. In this case, the wire harness is routed in the bent state inside the vehicle seat. Thus, in many cases, the operation for installing the wire harness in the vehicle seat becomes relatively complicated, which leads to an increase in manufacturing cost.

In addition, a seat frame is generally formed in a frame shape. Accordingly, when a wire harness needs to be held in a portion where a seat frame is not located in the vicinity thereto, for example, a bracket needs to be extended from the seat frame, with the result that the number of components is increased. This also causes a problem that the manufacturing cost is increased.

Thus, the present disclosure is to solve the above-described problems. An object of the present disclosure is to provide a vehicle seat in which a wire harness can be readily and inexpensively installed in a seat frame, and a method of manufacturing the vehicle seat.

A vehicle seat according to an aspect of the present disclosure includes: a seat frame; a wire harness routed along the seat frame; and a fixture configured to fix the wire harness to the seat frame. The fixture is formed of a resin molded product made of a single member including: a portion to be held and a plurality of holding portions, the portion to be held being configured to be held by the seat frame, and each of the plurality of holding portions being configured to hold a corresponding one of a plurality of different portions in the wire harness that are located in an extending direction of the wire harness. The wire harness is routed in a state where the wire harness in a bent state is held by the plurality of holding portions.

A method of manufacturing a vehicle seat according to an aspect of the present disclosure includes: preparing a seat frame; preparing a wire harness so as to be routed along the seat frame; preparing a fixture formed of a resin molded product made of a single member including a portion to be held and a plurality of holding portions, the portion to be held being configured to be held by the seat frame, and each of the plurality of holding portions being configured to hold a corresponding one of a plurality of different portions in the wire harness that are located in an extending direction of the wire harness; installing the wire harness in the fixture such that the wire harness is routed in a state where the wire harness in a bent state is held by the plurality of holding portions; and fixing the wire harness to the seat frame by installing the fixture, which has the wire harness installed therein, in the seat frame such that the portion to be held of the fixture is held by the seat frame.

The foregoing and other objects, features, aspects and advantages of the present disclosure will become more apparent from the following detailed description when taken in conjunction with the accompanying drawings.

DESCRIPTION OF THE PREFERRED EMBODIMENTS

Figure 1:
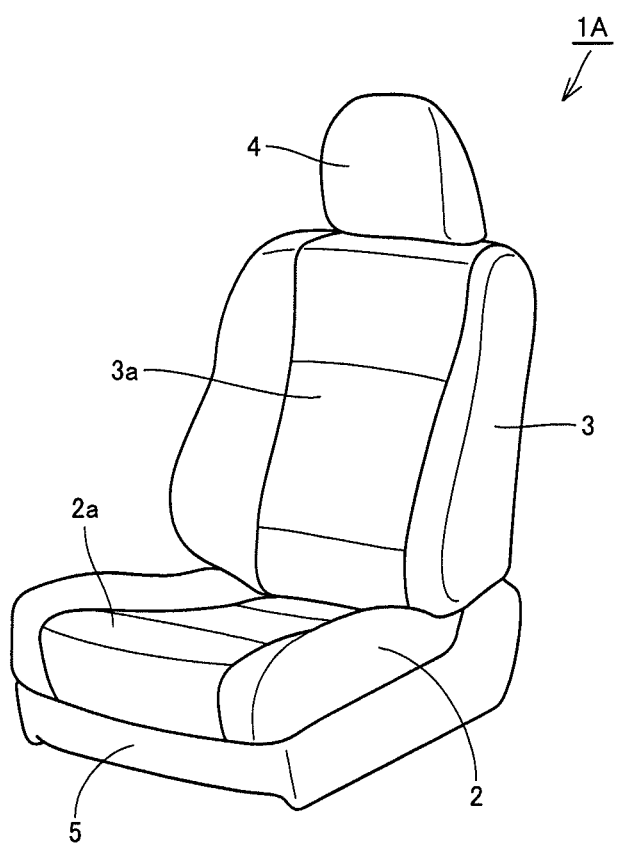
FIG. 1 is a schematic perspective view of a vehicle seat in the first embodiment.

In the following, embodiments will be described in detail with reference to the accompanying drawings. Each of the embodiments described below illustrates an example in which a characteristic configuration of the present disclosure is applied to a vehicle seat configured as an automobile seat, and a method of manufacturing the vehicle seat. In the embodiments described below, the same or corresponding components are designated by the same reference characters, and description thereof will not be repeated.

First Embodiment

FIG. 1 is a schematic perspective view of a vehicle seat in the first embodiment. First, referring to FIG. 1, the schematic configuration of a vehicle seat 1A in the present embodiment will be hereinafter described.

As shown in FIG. 1, vehicle seat 1A mainly includes a seat cushion 2, a seat back 3, a headrest 4, and a shield 5. Seat cushion 2 has an upper surface provided with a seat surface 2a on which an occupant of the vehicle can be seated. Seat back 3 has a front surface provided with a backrest surface 3a on which the occupant of the vehicle can lean. Headrest 4 is installed on seat back 3. Shield 5 is provided so as to cover the lower portion of seat cushion 2.

Vehicle seat 1A is installed in a vehicle such that backrest surface 3a provided on the front surface of seat back 3 faces forward of the vehicle. Vehicle seat 1A is mounted on the floor of the vehicle as a driver's seat, a passenger's seat, or a rear seat.

Figure 2:
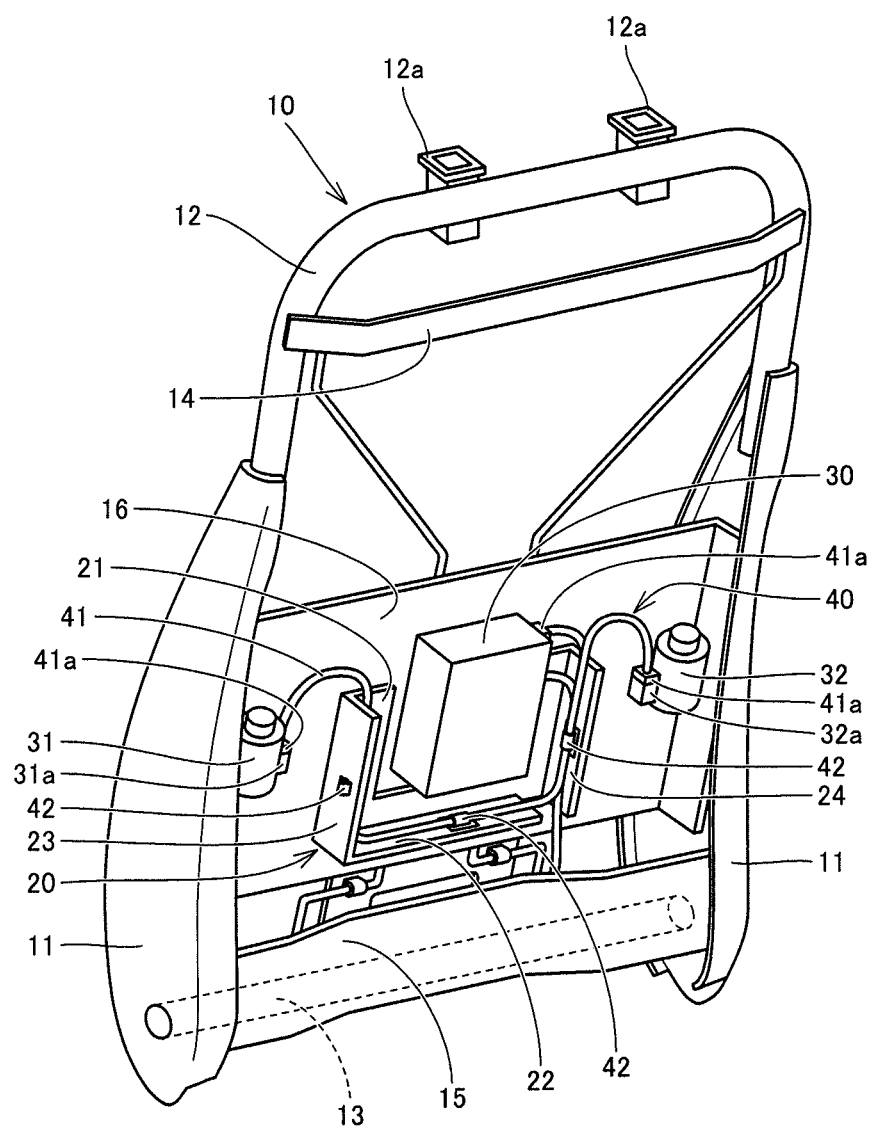
FIG. 2 is a schematic perspective view showing the internal structure of a seat back of the vehicle seat shown in FIG. 1.
Figure 3:
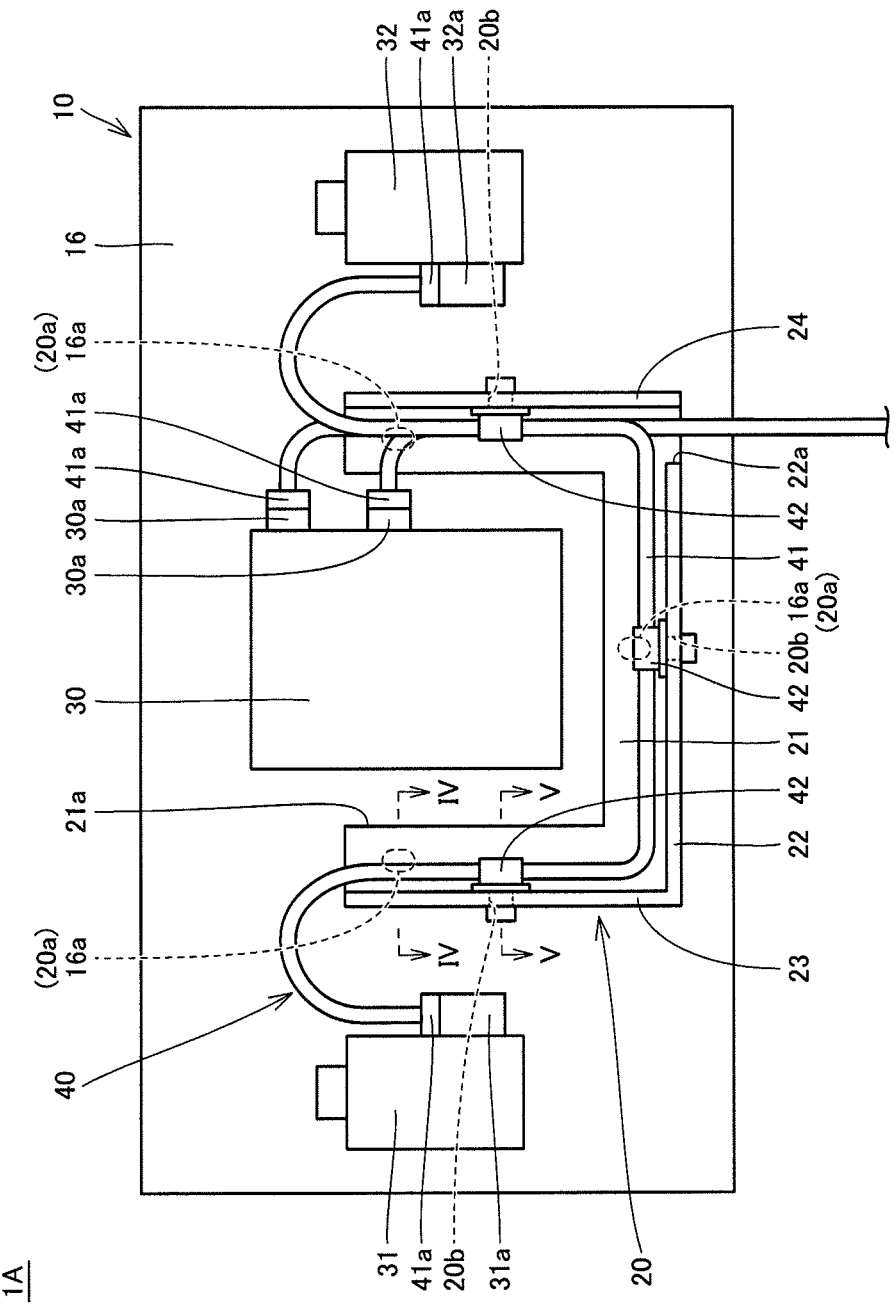
FIG. 3 is a schematic diagram of a main panel and various components installed therein shown in FIG. 2, as seen from the rear side.
Figure 4:
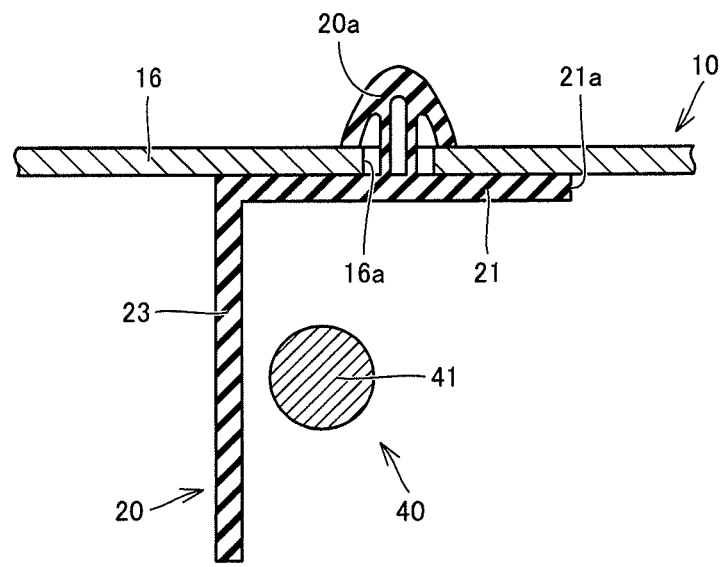
FIG. 4 is a schematic cross-sectional view taken along a line IV-IV shown in FIG. 3.
Figure 5:
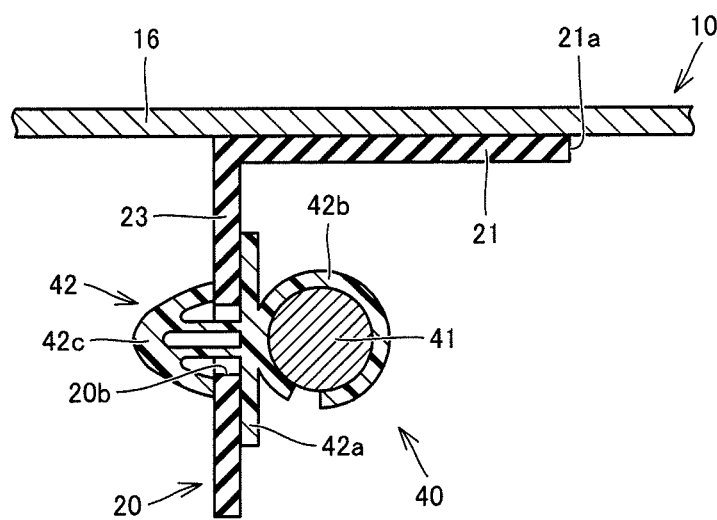
FIG. 5 is a schematic cross-sectional view taken along a line V-V shown in FIG. 3.

FIG. 2 is a schematic perspective view showing the internal structure of a seat back of the vehicle seat shown in FIG. 1. FIG. 3 is a schematic diagram of a main panel and various components installed therein shown in FIG. 2, as seen from the rear side. FIGS. 4 and 5 are schematic cross-sectional views taken along a line IV-IV and a line V-V, respectively, shown in FIG. 3. Then, referring to FIGS. 2 to 5, the internal structure of seat back 3 of vehicle seat 1A in the present embodiment will be hereinafter described in detail.

As shown in FIG. 2, back frame 10 as a seat frame is accommodated inside seat back 3. Back frame 10 is covered by a back pad (not shown) that is further covered by a back cover (not shown). Thereby, the outer surface of seat back 3 is to be covered mainly by the back cover.

Back frame 10 forms the framework of seat back 3, and mainly includes a pair of side frames 11, an upper pipe 12, a lower pipe 13, an upper panel 14, a lower panel 15, and a main panel 16. The pair of side frames 11, upper pipe 12, lower pipe 13, upper panel 14, lower panel 15, and main panel 16 each are formed of a metal member, for example, and combined in a frame shape, thereby constituting back frame 10.

Paired side frames 11 are arranged on both sides in the width direction of the seat so as to extend in the up-down direction of the seat. Upper pipe 12 has both ends that are bent. Each of both ends is fixed to a corresponding one of the upper ends of paired side frames 11 such that upper pipe 12 bridges the space between these upper ends. Thereby, a portion of upper pipe 12 excluding both ends thereof extends in the width direction of the seat. Lower pipe 13 is fixed to paired side frames 11 so as to bridge the space between the lower ends of paired side frames 11. Lower pipe 13 also extends in the width direction of the seat.

Upper panel 14 is fixed to upper pipe 12 so as to bridge the space between both ends of upper pipe 12. Upper panel 14 also extends in the width direction of the seat. Lower panel 15 is fixed to paired side frames 11 so as to bridge the space between the lower ends of paired side frames 11. Lower panel 15 also extends in the width direction of the seat. Main panel 16 is fixed to paired side frames 11 so as to bridge the space that is located between paired side frames 11 in the approximately center portion in the up-down direction of the seat. Main panel 16 also extends in the width direction of the seat.

A pair of headrest supports 12a is provided at portions of upper pipe 12 excluding the above-described both ends. The pair of headrest supports 12a is used for installing headrest 4 in seat back 3. The pair of headrest supports 12a serves to support headrest 4 in the state where headrest 4 is installed in seat back 3.

As shown in FIGS. 2 and 3, various types of electrical components are installed in main panel 16. Specifically, a pair of motors 31 and 32 as actuators, a control unit 30 for controlling the operations of the pair of motors 31 and 32, and a wire harness 40 mainly providing connection between the pair of motors 31, 32 and control unit 30 are fixed to the rear surface of main panel 16.

In the present embodiment, control unit 30 is disposed in the approximately center portion on the rear surface of main panel 16. Also, paired motors 31 and 32 are arranged on the right and left sides on the rear surface of main panel 16 so as to sandwich control unit 30. Furthermore, wire harness 40 is routed in the state where wire harness 40 is bent so as to weave between control unit 30 and paired motors 31, 32. In other words, wire harness 40 has portions extending in different directions.

In this case, the pair of motors 31 and 32, control unit 30, and wire harness 40 that are fixed to main panel 16 constitute an electrically-powered lumbar support mechanism, and serve to drive the lumbar support member (not shown) applied to the waist of the vehicle occupant with backrest surface 3a of the above-described seat back 3 interposed therebetween.

The pair of motors 31 and 32 and control unit 30 each are fixed to main panel 16 through a bracket (not shown) or the like made of metal or a resin. On the other hand, wire harness 40 is fixed to main panel 16 through a case body 20 as a fixture formed of a resin molded product made of a single member. In this case, it is preferable that case body 20 serving as a fixture is formed of an injection molded product that is suitably made of a resin material.

Case body 20 serving as a fixture has an outer shape formed in an approximately U shape as seen in a rear view. Case body 20 is disposed so as to surround control unit 30. More specifically, the left side portion and the right side portion of case body 20 are disposed on the left side and the right side, respectively, of control unit 30, and the lower portion of case body 20 is disposed below control unit 30.

Case body 20 includes: a main plate portion 21 attached to the rear surface of main panel 16; and a bottom plate portion 22 and a pair of side wall portions 23 and 24 that correspond to upstanding wall portions vertically arranged on main plate portion 21. Bottom plate portion 22 is vertically arranged on a portion of main plate portion 21 that corresponds to the above-described lower portion of case body 20. Paired side wall portions 23 and 24 are vertically arranged on portions of main plate portion 21 that correspond to the left side portion and the right side portion, respectively, of case body 20. Thereby, case body 20 is formed in a box shape that is partially opened to the outside.

Main plate portion 21 is provided with a cutout portion 21a so as to be formed in an approximately U shape. Thereby, case body 20 has an outer shape formed in an approximately U shape as seen in a rear view as described above. Also, case body 20 is configured such that it can be disposed to surround control unit 30 fixed to main panel 16. Furthermore, a cutout portion 22a through which wire harness 40 is inserted is separately provided at a prescribed position of bottom plate portion 22.

As shown in FIGS. 3 and 4, a total of three hole portions 16a are provided in portions of main panel 16 that overlap with main plate portion 21. These three hole portions 16a are provided such that case body 20 is held by main panel 16. Each of three hole portions 16a is provided in main panel 16 facing main plate portion 21 so as to correspond to a corresponding one of the lower portion, the left side portion and the right side portion described above.

Furthermore, on the front surfaces of main plate portion 21 that correspond to the lower portion, the left side portion and the right side portion of case body 20, engaging protrusions 20a serving as portions to be held are provided in their respective three hole portions 16a. Each of engaging protrusions 20a is configured such that it can be inserted into a corresponding one of hole portions 16a. Each engaging protrusion 20a is inserted into a corresponding one of hole portions 16a so as to be fitted therein. Thereby, case body 20 is fixed to main panel 16.

More specifically, as shown in FIG. 4, engaging protrusion 20a has a circumferential edge provided with a claw portion that can be elastically deformed. When engaging protrusion 20a is inserted into hole portion 16a, the claw portion comes into contact with the circumferential edge of hole portion 16a, so that the claw portion is elastically deformed inward. Further, when the claw portion slides over and beyond the circumferential edge of hole portion 16a, elastic deformation is eliminated, so that the claw portion recovers its original shape. Thereby, main panel 16 is to be sandwiched between main plate portion 21 of case body 20 and the claw portion of engaging protrusion 20a, so that case body 20 is fixed to main panel 16.

As shown in FIGS. 2 and 3, wire harness 40 includes: a plurality of cables 41; and connectors 41a each attached to a corresponding one of ends of the plurality of cables 41. The plurality of cables 41 are routed in the state where each of cables 41 is bent. The plurality of cables 41 are collectively bundled at one portion of each of the plurality of cables 41 in the extending direction thereof. Furthermore, each of connectors 41a attached to the ends of the plurality of cables 41 is connected to a corresponding one of a connector 30a and connectors 31a and 32a. Connector 30a is provided in the above-described control unit 30, and connectors 31a, 32a are provided in paired motors 31 and 32, respectively.

In this case, wire harness 40 has a total of three clips 42 installed at prescribed positions in the plurality of cables 41. These three clips 42 hold cable 41 at the positions where clips 42 are attached. Particularly, clip 42 attached to the portion where the plurality of cables 41 are bundled as described above serves to collectively hold the plurality of bundled cables 41.

As shown in FIGS. 3 and 5, a total of three hole portions 20b are provided in bottom plate portion 22 and the pair of side wall portions 23 and 24 of case body 20. These three hole portions 20b are provided such that wire harness 40 is held by case body 20. Each of three hole portions 20b is provided in a corresponding one of bottom plate portion 22 and the pair of side wall portions 23 and 24 in case body 20. It should be noted that a portion of case body 20 that is located in the vicinity of hole portion 20b serves as a holding portion for holding wire harness 40.

Each of the above-described three clips 42 in wire harness 40 is disposed in a corresponding one of three hole portions 20b provided in case body 20. As shown in FIG. 5, each of clips 42 includes: a base portion 42a attached to case body 20; and a cable holding portion 42b and an engaging protrusion 42c that are vertically arranged on base portion 42a.

Cable holding portion 42b serves to allow a prescribed cable among the plurality of cables 41 to be held. Engaging protrusion 42c serves to fix each clip 42 to case body 20. Each of engaging protrusions 42c is configured such that it can be inserted into a corresponding one of hole portions 20b. Each engaging protrusion 42c is inserted into a corresponding one of hole portions 20b so as to be fitted therein. Thereby, each clip 42 is fixed to case body 20.

More specifically, as shown in FIG. 5, engaging protrusion 42c has a circumferential edge provided with a claw portion that can be elastically deformed. When engaging protrusion 42c is inserted into hole portion 20b, the claw portion comes into contact with the circumferential edge of hole portion 20b, so that the claw portion is elastically deformed inward. Further, when the claw portion slides over and beyond the circumferential edge of hole portion 20b, elastic deformation is eliminated, so that the claw portion recovers its original shape. Thereby, case body 20 is to be sandwiched between base portion 42a of clip 42 and the claw portion of engaging protrusion 42c, so that clip 42 is fixed to case body 20. Accordingly, wire harness 40 is to be fixed to case body 20 through clip 42.

In this case, as shown in FIGS. 2 and 3, in the present embodiment, a cable guide portion through which cable 41 is inserted is formed of: a portion of main plate portion 21 that corresponds to the above-described lower portion of case body 20; and bottom plate portion 22 vertically arranged on this portion of main plate portion 21. Further, each clip 42 is installed from inside in a corresponding one of hole portions 20b provided in bottom plate portion 22. Thereby, cable 41 is to be routed in the state where a portion of cable 41 that is held by clip 42 installed in bottom plate portion 22 and a vicinity area of this portion are attached to the inner surface of case body 20 as the cable guide portion.

Furthermore, another cable guide portion through which cable 41 is inserted is formed also of: a portion of main plate portion 21 that corresponds to the above-described left side portion of case body 20; and side wall portion 23 vertically arranged on this portion of main plate portion 21. Further, each clip 42 is installed from inside also in a corresponding one of hole portions 20b provided in side wall portion 23. Thereby, cable 41 is to be routed in the state where a portion of cable 41 that is held by clip 42 installed in side wall portion 23 and a vicinity area of this portion are attached to the inner surface of case body 20 as another cable guide portion.

Furthermore, still another cable guide portion through which cable 41 is inserted is formed also of: a portion of main plate portion 21 that corresponds to the above-described right side portion of case body 20; and side wall portion 24 vertically arranged on this portion of main plate portion 21. Further, each clip 42 is installed from inside also in a corresponding one of hole portions 20b provided in side wall portion 24. Thereby, cable 41 is to be routed in the state where a portion of cable 41 that is held by clip 42 installed in side wall portion 24 and a vicinity area of this portion are attached to the inner surface of case body 20 as this still another cable guide portion.

Furthermore, the plurality of cables 41 included in wire harness 40 are drawn from the upper ends of the left side portion and the right side portion of case body 20 to the outside of case body 20 so as to be directed to control unit 30 and the pair of motors 31, 32, respectively. From the lower portion of case body 20, a specific cable 41 among the plurality of cables included in wire harness 40 is drawn out to the outside of case body 20 through cutout portion 22*a* provided in bottom plate portion 22.

Thus, in vehicle seat 1A in the present embodiment, the fixture for fixing wire harness 40 to back frame 10 is formed of case body 20 provided as a resin molded product made of a single member. Also, wire harness 40 is routed in the state where wire harness 40 in the bent state is held by case body 20.

Figure 6:
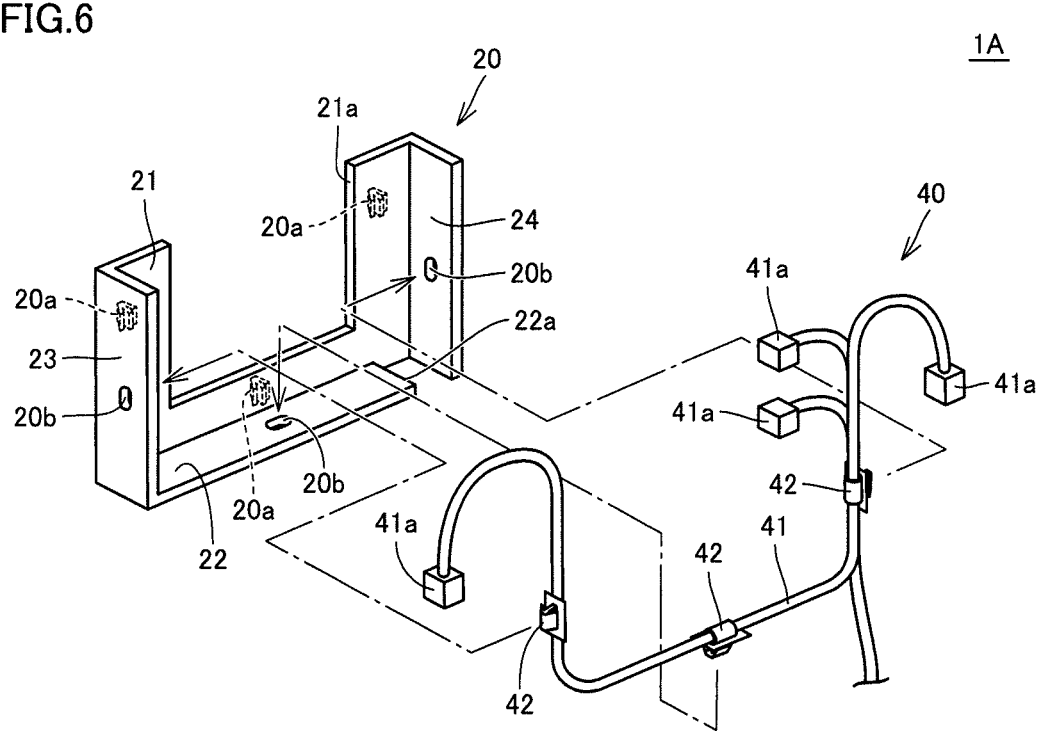
FIGS. 6 and 7 each are a schematic diagram for illustrating a method of manufacturing a vehicle seat in the first embodiment.
Figure 7:
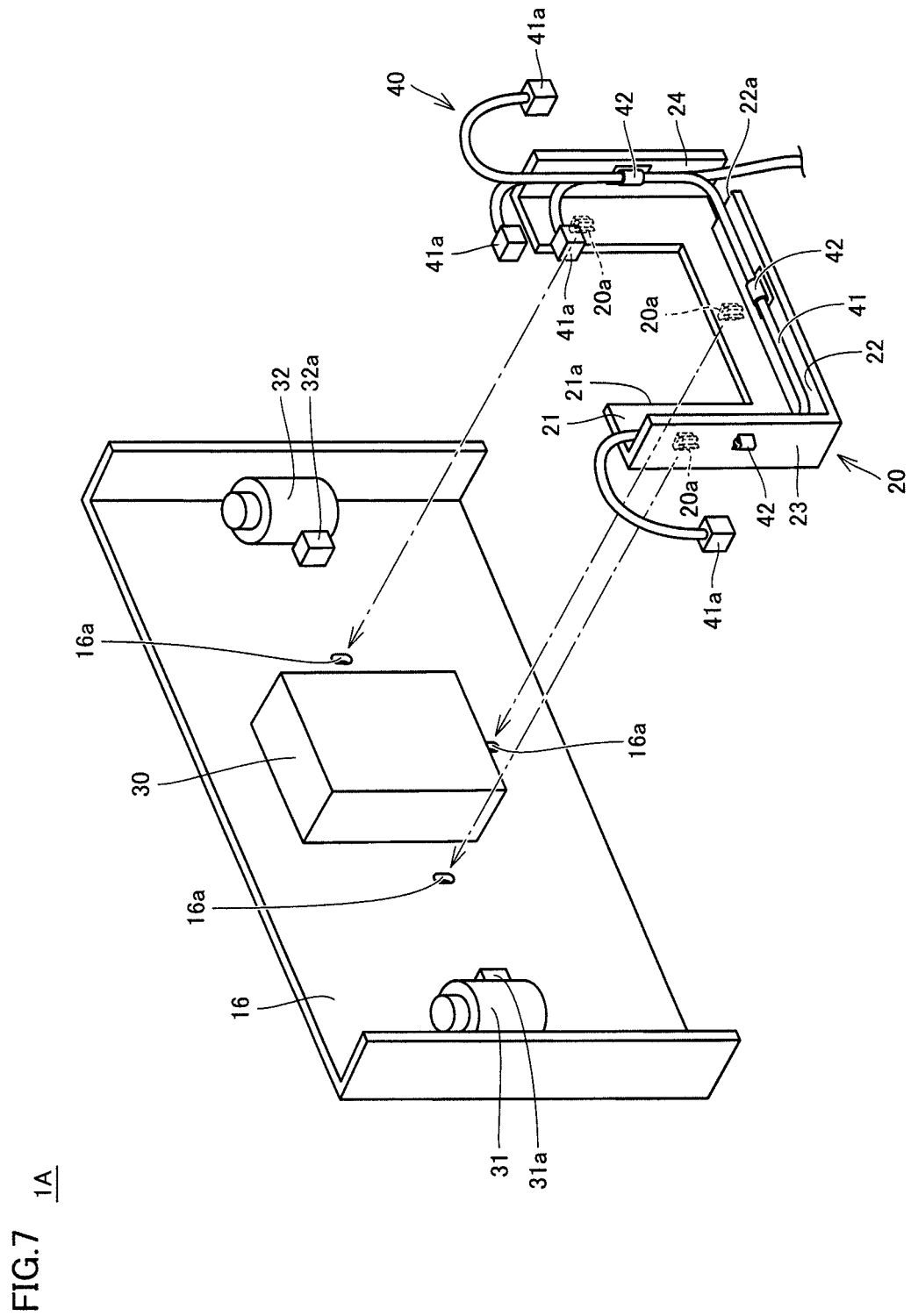

FIGS. 6 and 7 each are a schematic diagram for illustrating a method of manufacturing a vehicle seat in the present embodiment. Then, referring to FIGS. 6 and 7, a method of manufacturing vehicle seat 1A in the above-described present embodiment (more specifically, a method of fixing wire harness 40 to back frame 10) will be hereinafter described in detail.

As shown in FIG. 6, when wire harness 40 is fixed to back frame 10, first, wire harness 40 that is to be routed along back frame 10 after installation is prepared. Also, case body 20 as a fixture formed of a resin molded product made of a single member for fixing wire harness 40 to back frame 10 is prepared. In this case, wire harness 40 to be prepared includes a plurality of cables 41 each having an end to which connector 41*a* is attached in advance. Also, at a prescribed position of each of the plurality of cables 41, clip 42 is installed.

Then, wire harness 40 is installed in case body 20 as a fixture. Specifically, each of total three clips 42 in wire harness 40 is fitted in a corresponding one of total three hole portions 20*b* provided in bottom plate portion 22 and a pair of side wall portions 23 and 24 of case body 20. Thereby, wire harness 40 is held by case body 20 at a position where each clip 42 is provided. Thus, wire harness 40 in the bent state is routed and held in case body 20.

Then, as shown in FIG. 7, case body 20 having the bent wire harness 40 installed therein is installed in main panel 16 of back frame 10 in which control unit 30 and the pair of motors 31 and 32 are installed in advance. Specifically, each of total three engaging protrusions 20*a* provided on the front surface of main plate portion 21 in case body 20 is fitted in a corresponding one of total three hole portions 16*a* provided in main panel 16. Thereby, case body 20 is to be held by main panel 16 at the positions where engaging protrusions 20*a* are provided. Thus, wire harness 40 that is held in the bent state by case body 20 is fixed to main panel 16 with case body 20 interposed therebetween while wire harness 40 is still kept in the bent state.

In addition, FIG. 7 shows only main panel 16 in back frame 10 for the sake of easy understanding. In fact, it is preferable that back frame 10 including main panel 16 is assembled before the above-described installment of case body 20 in main panel 16.

Then, each of the plurality of connectors 41*a* included in wire harness 40 is separately connected to a corresponding one of connector 30*a*, connectors 31*a* and 32*a*. Connector 30*a* is provided in control unit 30, and connectors 31*a* and 32*a* are provided in the pair of motors 31 and 32, respectively.

In this way, by employing vehicle seat 1A in the present embodiment and the above-described method of manufacturing a vehicle seat for manufacturing this vehicle seat 1A, wire harness 40 is installed in advance in case body 20 as a fixture made of a single member formed of a resin molded product, so that wire harness 40 is formed in the bent state, and thereafter, case body 20 having the bent wire harness 40 installed therein is installed in back frame 10. Accordingly, installment of wire harness 40 in back frame 10 is simplified, so that the manufacturing cost is reduced.

Also, as described above, the present embodiment provides a configuration in which a part of wire harness 40 is routed along the inner surface of case body 20. Accordingly, the workability at the time when case body 20 having wire harness 40 installed therein is installed in back frame 10 is further significantly improved.

In addition, as described above, in the present embodiment, engaging protrusion 20*a* provided in case body 20, which serves as a portion to be held provided in the fixture, is provided on the front surface of main plate portion 21 of case body 20. Accordingly, case body 20 having wire harness 40 installed therein can be installed in back frame 10 in a simple operation of attaching main plate portion 21 of case body 20 to the rear surface of back frame 10. Therefore, also in this point, the workability during installment is significantly improved.

Furthermore, as described above, the present embodiment provides a configuration in which hole portion 20*b* provided in case body 20, which serves as a holding portion provided in the fixture, is provided in each of bottom plate portion 22 and the pair of side wall portions 23 and 24 in case body 20 that are provided as upstanding wall portions in the fixture. Accordingly, for repairs or replacement of wire harness 40, only wire harness 40 can be removed from case body 20 without having to remove case body 20 from back frame 10, so that the workability during maintenance is significantly improved.

Furthermore, as described above, the present embodiment provides a configuration in which wire harness 40 is fixed through clips 42 provided with engaging protrusions 42*c* that are fitted in hole portions 20*b* of case body 20. Accordingly, the operation of installing wire harness 40 in case body 20 can also be extremely readily performed.

As described above, by employing vehicle seat 1A and the method of manufacturing vehicle seat 1A as in the present embodiment, wire harness 40 can be readily and inexpensively installed in back frame 10 as compared with the conventional case.

Second Embodiment

Figure 8:
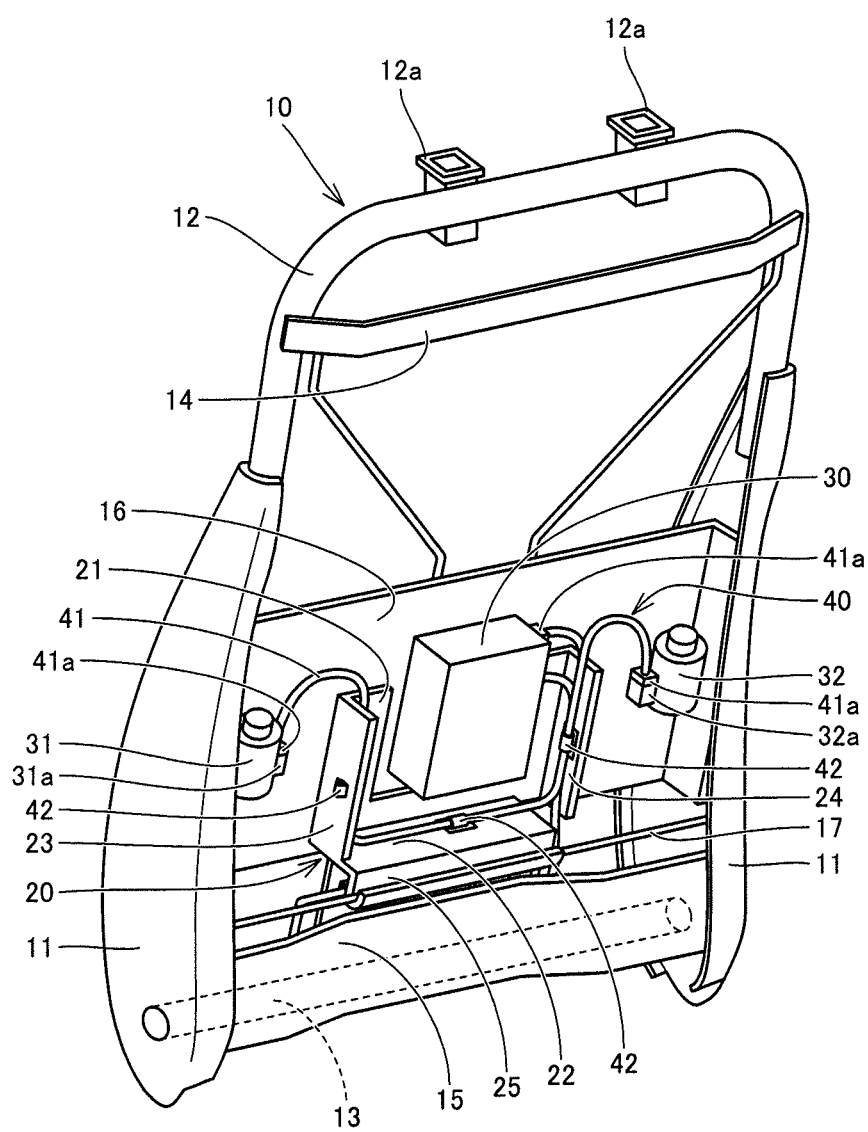
FIG. 8 is a schematic perspective view showing the internal structure of a seat back of a vehicle seat in the second embodiment.
Figure 9:
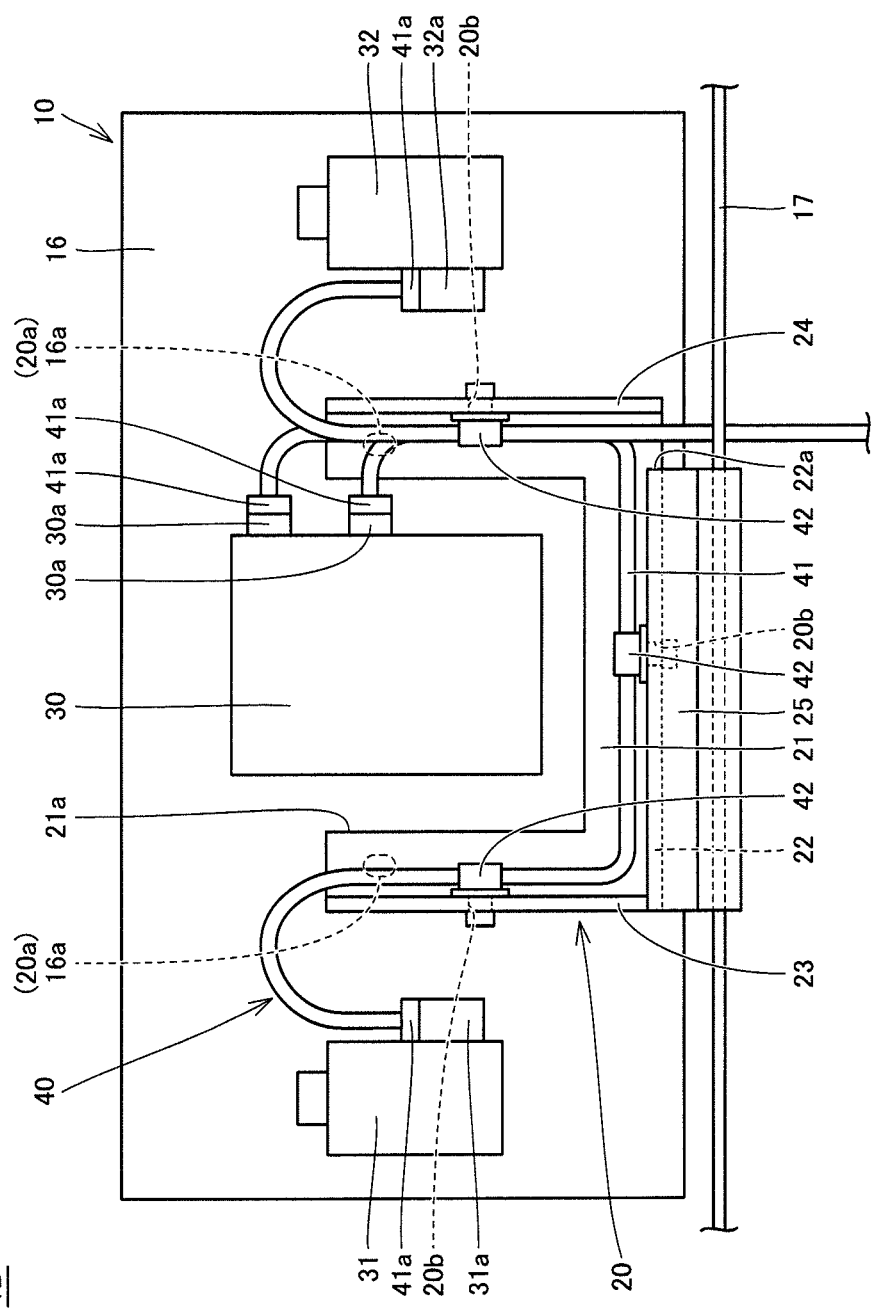
FIG. 9 is a schematic diagram of a main panel and various components installed therein shown in FIG. 8, as seen from the rear side.

FIG. 8 is a schematic perspective view showing the internal structure of a seat back of a vehicle seat in the second embodiment. FIG. 9 is a schematic diagram of a main panel and various components installed therein shown in FIG. 8, as seen from the rear side. In the following, a vehicle seat 1B in the present embodiment will be hereinafter described with reference to FIGS. 8 and 9.

As shown in FIGS. 8 and 9, a vehicle seat 1B in the present embodiment is different from vehicle seat 1A in the above-described first embodiment only in the configuration of bottom plate portion 22 of case body 20 as a fixture, and in the structure of holding case body 20 by back frame 10 in the vicinity of bottom plate portion 22.

Specifically, a portion of main plate portion 21 that corresponds to the lower portion of case body 20 and that corresponds to vertically arranged bottom plate portion 22 is not provided with engaging protrusion 20*a* (see FIGS. 6 and 7) for fixing case body 20 to main panel 16, but instead provided with a hook portion 25 at the rear end of bottom plate portion 22. Hook portion 25 hangs downward and has a tip end that is bent upward.

On the other hand, wire 17 is suspended between main panel 16 and lower panel 15 of back frame 10 so as to bridge the space between the pair of side frames 11. Wire 17 is suspended under tension so as to extend in the width direction of the seat.

Hook portion 25 provided in the above-described case body 20 is configured such that wire 17 can be hooked over this hook portion 25. Also, hook portion 25 includes a receiving portion in which wire 17 is held. The receiving portion extends in the above-described width direction of the seat. As wire 17 is held by the receiving portion provided in hook portion 25, the lower end of case body 20 is fixed to back frame 10.

Although the detailed explanation will not be made, the upper end of case body 20 is fixed to main panel 16 through a total of two engaging protrusions 20a that are provided on the front surface of main plate portion 21.

In this way, also in vehicle seat 1B in the present embodiment, as in the above-described first embodiment, the fixture for fixing wire harness 40 to back frame 10 is formed of case body 20 provided as a resin molded product made of a single member, and also, wire harness 40 is routed in the state where wire harness 40 in the bent state is held by case body 20.

Therefore, also by vehicle seat 1B in the present embodiment, the effect almost identical to the effect described in the above first embodiment is achieved. Thus, as compared with the conventional case, wire harness 40 can be readily and inexpensively installed in back frame 10. Although the explanation thereof will not be given, the procedure for fixing wire harness 40 to back frame 10 in vehicle seat 1B is also carried out according to the procedure in the above-described first embodiment.

Other Embodiments and the Like

In the above-described first and second embodiments, an explanation has been given with reference to an example in which a fixture is formed of a case body having a box shape that is partially opened to the outside, but the shape of the fixture is not limited thereto, and can be variously modified in accordance with the way how the wire harness to be installed is routed. For example, the fixture may be formed in an approximately L shape or an approximately S shape as seen in a rear view.

In the above-described first and second embodiments, an explanation has been given with reference to an example in which a wire harness is held by a fixture at three positions (that is, fixed at three positions), but the number of fixing positions is not limited thereto, and may be any number as long as the number of fixing positions is two or more. Furthermore, the fixing method employed at these fixing positions may be a method using a clip as described above, or may be other fixing methods. Furthermore, the positions at which the wire harness is fixed to the fixture may also be able to be variously changed.

In the above-described first and second embodiments, an explanation has been given with reference to an example in which a plate-shaped main plate portion provided in a fixture is held by a back frame, so that the fixture is fixed to the back frame. However, the fixing position, the fixing method, the number of fixing positions and the like may also be able to be variously changed.

In the above-described first and second embodiments, an explanation has been given with reference to an example in which the characteristic configuration in the present disclosure is applied to installation of various types of electrical components that form an electrically-powered lumbar support mechanism. However, the characteristic configuration in the present disclosure may also be able to be applied to installation of electrical components constituting another electrically-powered mechanism such as an electrically-powered reclining mechanism.

In the above-described first and second embodiments, an explanation has been given with reference to an example in which the characteristic configuration in the present disclosure is applied to installation of electrical components fixed to the back frame included in the seat back of the vehicle seat. However, the characteristic configuration in the present disclosure may also be able to be applied to installation of electrical components fixed to the cushion frame included in the seat cushion of the vehicle seat.

Furthermore, the present disclosure is applicable not only to a vehicle seat for one person but also to a vehicle seat for a plurality of persons, and further applicable not only to a vehicle seat for an automobile but also to any vehicle seat such as a ship seat, an airplane seat, and a train seat.

The above-described details of the present disclosure are summarized as follows.

A vehicle seat according to an aspect of the present disclosure includes: a seat frame; a wire harness routed along the seat frame; a fixture configured to fix the wire harness to the seat frame. The fixture is formed of a resin molded product made of a single member including a portion to be held and a plurality of holding portions, the portion to be held being configured to be held by the seat frame, and each of the plurality of holding portions being configured to hold a corresponding one of a plurality of different portions of the wire harness that are located in an extending direction of the wire harness. The wire harness is routed in a state where the wire harness in a bent state is held by the plurality of holding portions.

By the vehicle seat configured in this way, the wire harness is installed in advance in the fixture formed of a single member made of a resin molded product, so that the wire harness is formed in the bent state, and thereafter, the fixture having the bent wire harness installed therein can be installed in the seat frame. Accordingly, installment of the wire harness in the seat frame can be simplified, so that the manufacturing cost can be reduced.

In the vehicle seat according to an aspect of the present disclosure, the fixture may be formed of a case body formed in a box shape that is at least partially opened, the case body having a main plate portion and an upstanding wall portion that is vertically arranged on the main plate portion. Also in this case, a part of the wire harnesses may be routed along an inner surface of the case body.

By the vehicle seat configured in this way, the wire harness is held by the fixture in the state where the wire harness is routed along the fixture formed of a case body having a box shape. Accordingly, the workability at the time when the fixture having the wire harness installed therein is installed in the seat frame is further more significantly improved.

In the vehicle seat according to an aspect of the present disclosure, the portion to be held may be provided in the main plate portion to allow the case body to be installed in the seat frame in a state where the main plate portion is attached to the seat frame. Also in this case, the plurality of holding portions may be provided in the upstanding wall portion.

By the vehicle seat configured in this way, the fixture having the wire harness installed therein can be installed in the seat frame in a simple operation of installing the main plate portion of the fixture in the rear surface of the seat frame. Furthermore, by the configuration in which the wire harness is installed not in the main plate portion of the fixture but in the upstanding wall portion, only the wire harness can also be removed from the seat frame without having to remove the fixture from the seat frame for the purpose of repairs or replacement of the wire harness. Accordingly, the workability is significantly improved.

In the vehicle seat according to an aspect of the present disclosure, the wire harness may have a plurality of clips, each of the plurality of clips being provided in a corresponding one of the plurality of holding portions. Also in this case, each of the plurality of the clips may be fitted in a corresponding one of the plurality of holding portions.

By the vehicle seat configured in this way, the wire harness can be installed in the fixture in an extremely simple operation of fitting the clip provided in the wire harness in the holding portion provided in the fixture. Accordingly, the workability for installing the wire harness in the fixture is further significantly improved.

A method of manufacturing a vehicle seat according to an aspect of the present disclosure includes: preparing a seat frame; preparing a wire harness to be routed along the seat frame; preparing a fixture formed of a resin molded product made of a single member including a portion to be held and a plurality of holding portions, the portion to be held being configured to be held by the seat frame, and each of the plurality of holding portions being configured to hold a corresponding one of a plurality of different portions in the wire harness that are located in an extending direction of the wire harness; installing the wire harness in the fixture such that the wire harness is routed in a state where the wire harness in a bent state is held by the plurality of holding portions; and fixing the wire harness to the seat frame by installing the fixture, which has the wire harness installed therein, in the seat frame such that the portion to be held of the fixture is held by the seat frame.

By manufacturing the vehicle seat according to the above-described manufacturing method, a wire harness is installed in advance in a fixture made of a single member formed of a resin molded product, so that the wire harness is formed in the bent state, and thereafter, the fixture having the bent wire harness installed therein is installed in the seat frame. Accordingly, the wire harness can be readily installed in the seat frame, so that the manufacturing cost can be reduced.

Although the embodiments of the present disclosure have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A vehicle seat comprising:
a seat frame;
a wire harness routed along the seat frame, wherein the wire harness has a length; and
a fixture configured to fix the wire harness to the seat frame,
the fixture being formed of a resin molded product made of a single member including a portion to be held and a plurality of holding portions, the portion to be held being configured to be inserted through and held by the seat frame, and each of the plurality of holding portions being configured to hold a corresponding one of a plurality of different portions in the wire harness that are located along the length of the wire harness,
the wire harness being routed in a state where the wire harness in a bent state is held by the plurality of holding portions, wherein
the wire harness has a plurality of clips, each of the plurality of clips being provided in a corresponding one of the plurality of holding portions, and
each of the plurality of clips is fitted in a corresponding one of the plurality of holding portions.

2. The vehicle seat according to claim 1, wherein the fixture is formed of a case body formed in a box shape that is at least partially opened, the case body having a main plate portion and an upstanding wall portion that is vertically arranged on the main plate portion, and
a part of the wire harness is routed along an inner surface of the case body.

3. The vehicle seat according to claim 1, wherein an aperture in the fixture defines each of the holding portions.

4. The vehicle seat according to claim 2, wherein a portion of the case body located in a vicinity of a hole portion serves as a respective holding portion of the plurality of holding portions.

5. The vehicle seat according to claim 1, wherein the wire harness being routed in the state where a cable of the wire harness in the bent state is held by the plurality of holding portions within the fixture.

6. A vehicle seat comprising:
a seat frame;
a wire harness routed along the seat frame, wherein the wire harness has a length; and
a fixture configured to fix the wire harness to the seat frame,
the fixture being formed of a resin molded product made of a single member including a portion to be held and a plurality of holding portions, the portion to be held being configured to be inserted through and held by the seat frame, and each of the plurality of holding portions being configured to hold a corresponding one of a plurality of different portions in the wire harness that are located along the length of the wire harness,
the wire harness being routed in a state where the wire harness in a bent state is held by the plurality of holding portions, wherein
the fixture is formed of a case body formed in a box shape that is at least partially opened, the case body having a main plate portion and an upstanding wall portion that is vertically arranged on the main plate portion,
a part of the wire harness is routed along an inner surface of the case body,
the portion to be held is provided in the main plate portion to allow the case body to be installed in the seat frame in a state where the main plate portion is attached to the seat frame, and
the plurality of holding portions are provided in the upstanding wall portion.

* * * * *